Nov. 3, 1936.  L. E. WHITTAKER  2,059,426
COMBINED CLOSURE AND SHUTTER DRIVE
Filed July 26, 1934  4 Sheets-Sheet 4

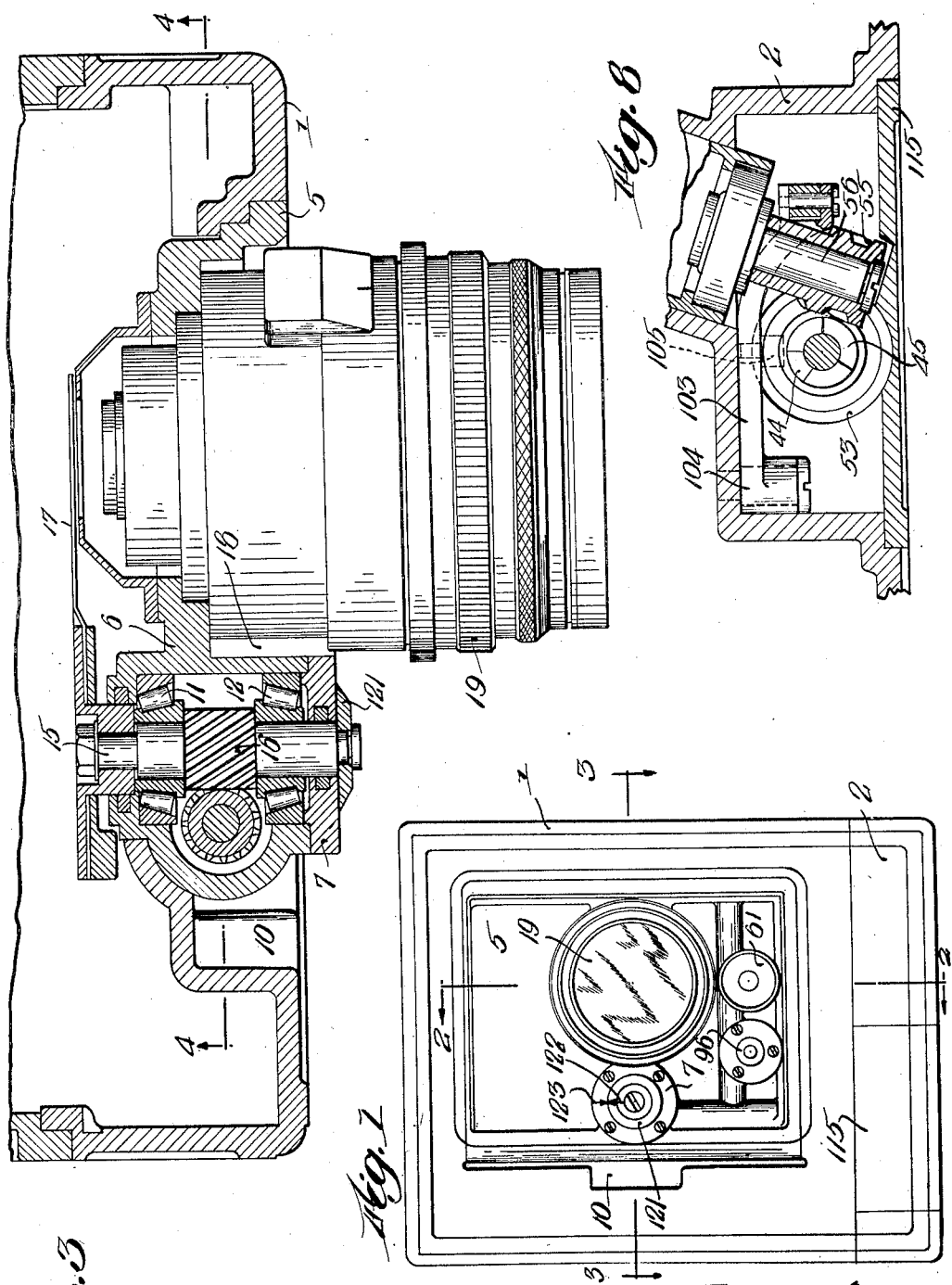

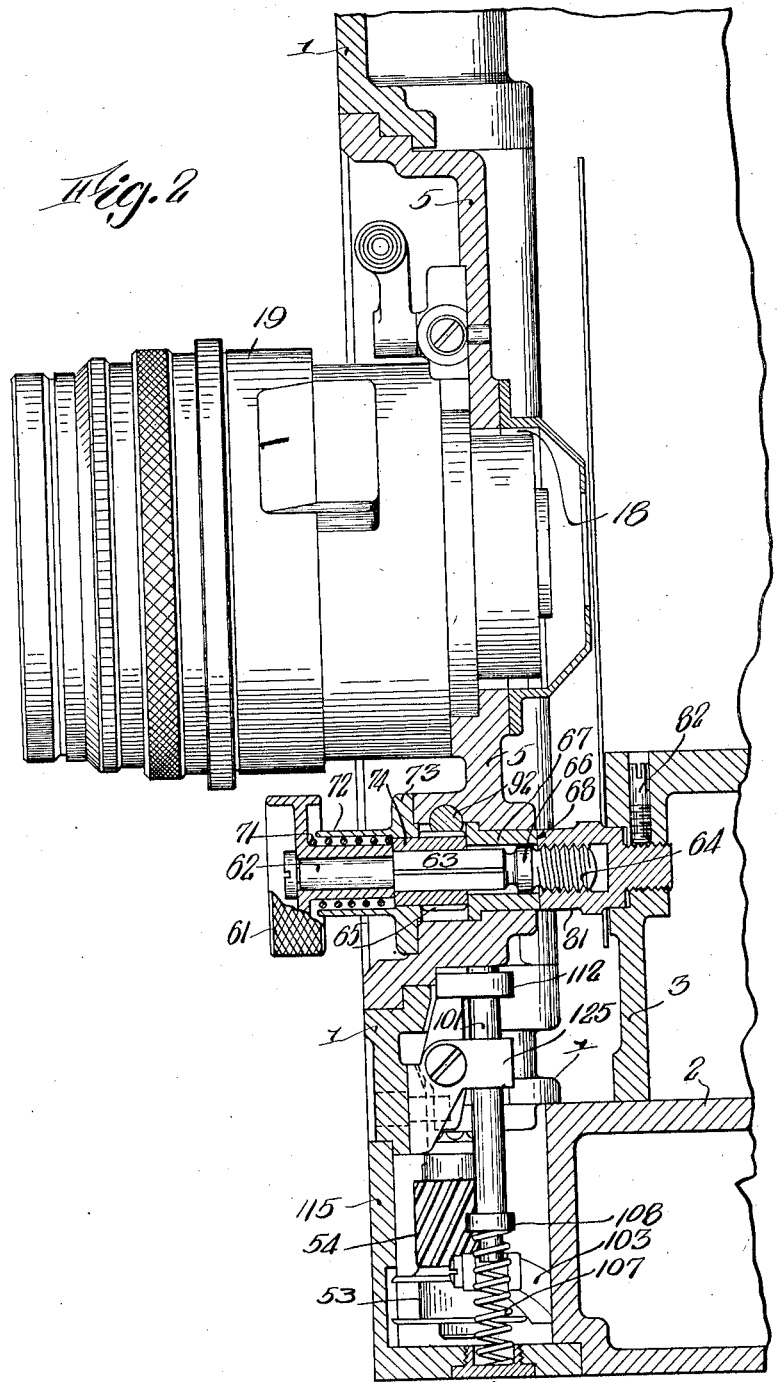

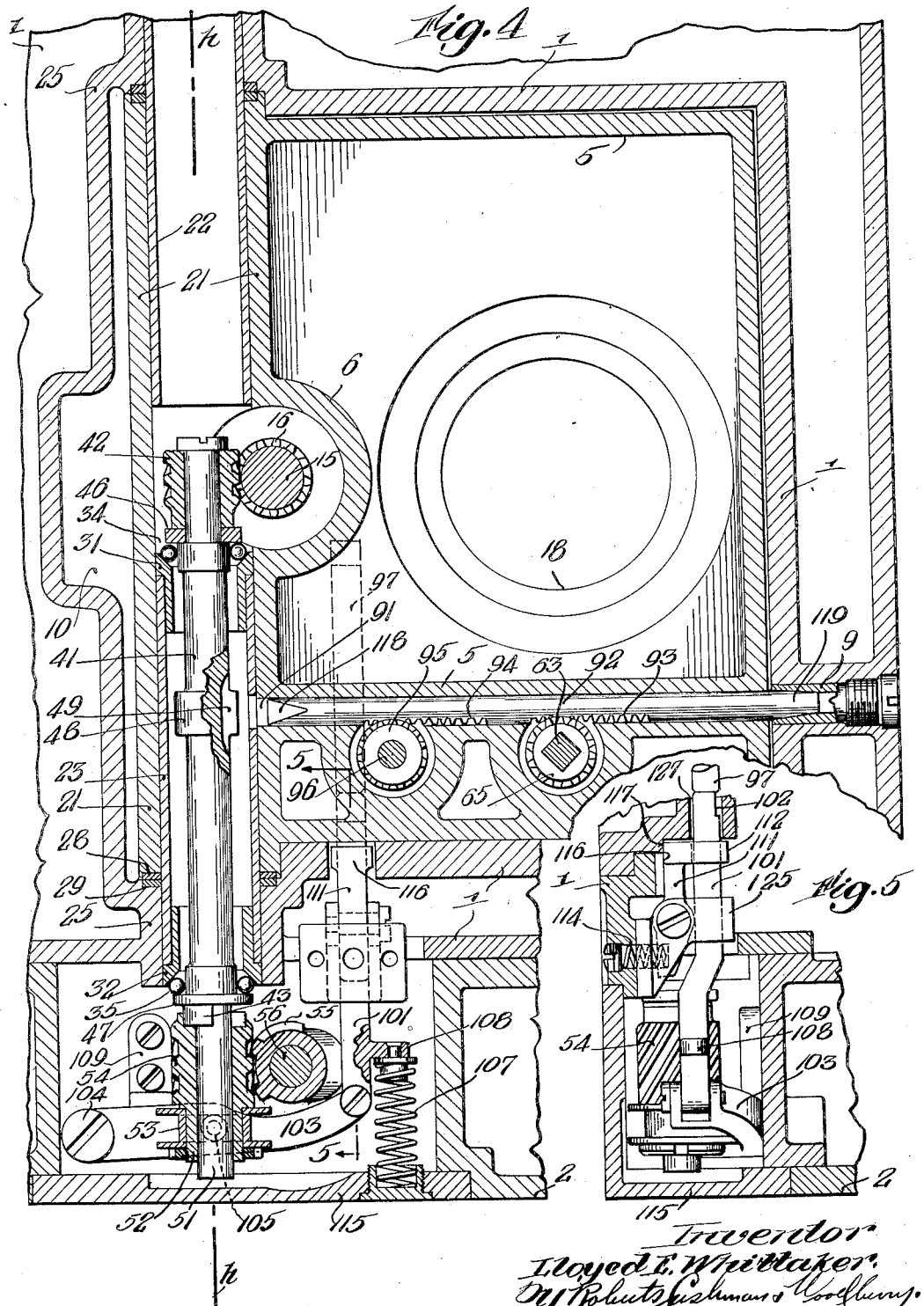

Inventor
Lloyd E. Whittaker

Patented Nov. 3, 1936

2,059,426

UNITED STATES PATENT OFFICE 2,059,426

COMBINED CLOSURE AND SHUTTER DRIVE

Lloyed E. Whittaker, Los Angeles, Calif., assignor to Technicolor Motion Picture Corporation, Hollywood, Calif., a corporation of Maine Application July 26, 1934, Serial No. 737,031

10 Claims. (Cl. 88—17)

The present invention relates to interlocked closure and drive arrangements, especially as applied to optical apparatus as cameras and similar photographic devices.

In certain photographic apparatus, as for example in motion picture cameras, it is desirable to establish a positive relation between optical control elements as shutter or film movements, and the parts permitting access to the interior of the camera, as doors hinged or otherwise associated with the camera housing, so that, for example, the opening of a door is not interfered with by the shutter, or the latter damaged through the opening of the former. It is therefore one of the principal objects of the present invention to provide an arrangement for positively correlating the positions of the door and a movement, for example the shutter, of a photographic camera, to provide an arrangement which prevents a change in the position of the closure element before the movement has been brought into a position where it does not interfere with the closure element, and to provide for maintaining the movement in that position until the closure is again in proper position relatively to the apparatus.

In another aspect, the invention contemplates the automatic disengagement of the movement from its drive upon opening of the closure, reengagement in predetermined position relatively to the drive and therefore to other mechanisms of the apparatus actuated by that drive, upon closing the apparatus, maintenance of the disengagement of the movement so long as the apparatus is open, and locking of the closure so long as drive and movement are effectively connected.

A further aspect of the invention is the connection of apparatus housing and closure by means of a hinge and by leading the driving link between drive and movement (for example a shutter) through the hinge, for example with a shaft coaxial with the hinge pin as described and claimed in copending application Serial No. 737,-032 filed July 26, 1934, and the interlocking of this drive with the closure.

Still another object of the invention is to provide for securely locking the closure in the apparatus housing and for exact fixation of the relative position of the closure, for example the door, and the housing, by means of a pressure contact device which is automatically released upon unlocking the closure. These and other objects, features and aspects of the invention will be apparent from the following explanation of its genus with reference to a concrete embodiment thereof. The description refers to drawings, in which;

Fig. 1 is a front elevation of a motion picture camera incorporating the device according to the present invention;

Fig. 2 is a vertical section on line 2—2 of Fig. 1 with the door in locked position;

Fig. 3 is a horizontal section on line 3—3 of Fig. 1; Fig. 4 is a vertical section on line 4—4 of Fig. 3, with the door locked;

Fig. 5 is a vertical section on line 5—5 of Fig. 4, showing the clutch mechanism;

Fig. 8 is a horizontal section on line 8—8 of Fig. 6.

The shutter drive arrangement constituting the subject matter of the above mentioned copending application Serial No. 737,032 will be included in the disclosure of the herein described embodiment of the present invention. Although one aspect of this preferred embodiment includes in combination the peculiar shutter drive of the copending application, it is expressly understood that this aspect includes the correlation of the closure construction and any other drive arrangements which may be preferred in other embodiments of the present invention.

Figure 7:
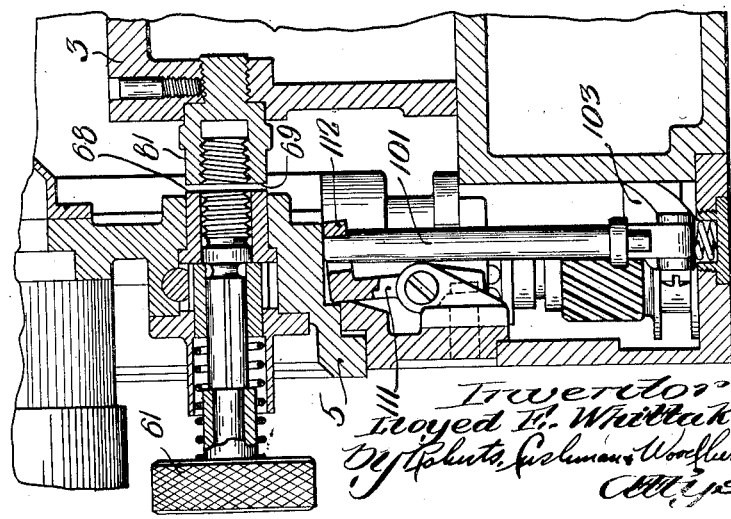
Fig. 7 is a section similar to Fig. 5, likewise with the door unlocked.

Referring to the drawings, I denotes the walls of a camera housing, 2 is a bottom suitably secured to the housing, and 3 (Figs. 2 and 7) is part of the support on which the film guiding elements of the camera are mounted. A door 5 preferably like the housing a light metal casting, has a clutch journal boss 6 and a journal plate 7 (Fig. 3) supporting two ball bearings 11 and 12 for shutter shaft 15 to which a helical gear wheel 16 and the shutter proper 17 are fastened. The camera housing has a recess or pocket 10 (Figs. 1, 3, and 4) which receives the shutter support portion of the door in open position. A central opening 18 permits entrance of the light through lens system 19, which is not part of the present invention and therefore not further described. The shutter shaft housing extends upwardly and downwardly, forming hinge portions 21 with pressed in or otherwise fastened tubes 22, 23, which extend into essentially tubular hinge receptacles 25 of the housing which form journals for tubes 22, 23, permitting rotation of the door about hinge axis h—h. Thrust bearing rings 28, 29 support the door in vertical direction.

Fastened to tube 23 are two sleeves 31 and 32 which form beveled seats for ball bearings 34 and 35 supporting shaft 41 on collars 46 and 47. This shaft is mounted coaxially with the hinge, that is, its axis of rotation coincides with hinge axis h. To the upper end of shaft 41 is screwed a helical gear wheel 42 drivingly engaging the above-described gear wheel 16 of the shutter shaft. The lower end of shaft 41 forms one-half 43 of a single position clutch, having two unequal claws corresponding to the recesses 44 and 45 of the other clutch half shown in Fig. 8. Between the two bearings, shaft 41 is upset to form a collar 48. This collar has a slot 49 whose purpose will be explained later. Shaft 41 extends downwardly at 51, where it guides the lower half 52, of the aforementioned clutch, with clutch sleeve 53 having two flanges in well known manner, and gear wheel 54 engaging worm 55 which is driven through shaft 56 (Fig. 8) connected to any driving element suitable for the present purpose, as for example, a motor driven flexible shaft.

Door 5 further supports a locking mechanism actuated by knob 61 (Figs. 2 and 7) screwed to an axle 62 having a prismatic portion 63 and, at the other end, a threaded portion 64. Loosely on prism 63 slides a pinion 65, whereas a cylindrical collar 66 guides axle 62 in sleeve 67 secured to the door casting 5. A helical spring 71, confined between the sleeve of knob 61 and tubular extension 72 of door lock cover 73, and resting on knob and pinion 65, respectively, tends to move axle 62 outwardly, this axial movement being limited when collar 66 strikes pinion 65, which is confined between sleeve 67 and cover 73, in which the round portion 74 of the pinion turns.

The threaded portion 64 of axle 62 (Fig. 2) is adapted to engage the tapped hole of stop boss 81 adjustably fastened to film movement support 3 by means of a screw and thread, and fixed by means of lock screw 82.

In a hole 91 (Figs. 4 and 6) extending through the entire width of the door slides a rack rod 92, whose toothed portion 93 engages pinion 65 of the above-described lock mechanism. A second toothed portion 94 engages pinion 95 sitting on axle 96 which is mounted in the door casting similar to shaft 62.

A second, vertical rack rod 97 (Figs. 4 and 6) extends downwardly within the door casting, and like rod 92 engages pinion 95. It has a rounded lower end normally resting upon the clutch actuator 101 now to be described.

Figure 6:
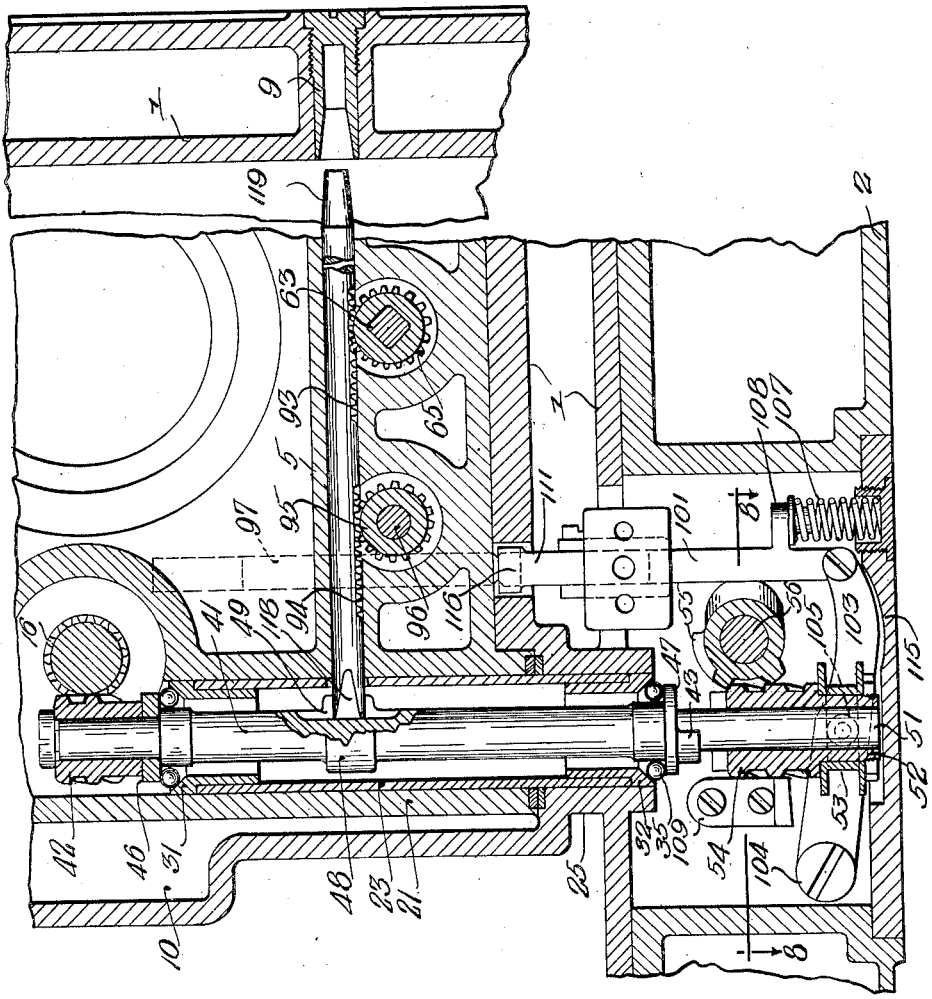
Fig. 6 is a section similar to Fig. 4 but with the door unlocked and ready to be opened.

The clutch actuator 101 (Figs. 4, 5, 6, 7, and 8) is a rod having at its upper end a recess 102 and being at its lower end joined to clutch lever 103 pivoted at 104 to the camera base. A roller 105 (Fig. 8) suitably fastened to the side of lever 103, engages clutch sleeve 53 already described. The actuator slides in guide piece 125 (Fig. 5), which, in conjunction with lever 103 permits only a substantially vertical up and down movement of the actuator. A spring 107 between nose 108 of the actuator and the wall of cover 115 tends to lift the actuator, which movement is, however, limited by stop 108 (Figs. 4 and 6).

Arranged within guide piece 125 is a two armed lever 111 (Figs. 5 and 7) whose upper arm has a catch 112 adapted to engage the aforementioned recess 102 whereas the lower arm is pushed inwardly by a spring 114 forcing catch 112 towards the actuator rod. The back 116 of the catch is so arranged that the edge 117 of the closed door 5 (Figs. 5 and 7) presses the catch inwardly, thereby disengaging it from recess 102, as will be explained more in detail hereinafter. In lifted position, the actuator extends into opening 127 of the door, as shown in Fig. 5, preventing it in this position from being opened.

The clutch mechanism is confined within angular cover 115 (Figs. 4 and 5) detachably fastened to camera housing 1 and base casting 2. It will be observed that by removing cover 115, and detaching lever 103 at 104, the clutch control mechanism can be removed for inspection or cleaning.

One end 118 of horizontal rack rod 92 (Figs. 4 and 6) is wedge shaped and adapted to engage slot 49 of hinge shaft 41, whereas the other end 119 is conical and constitutes a bolt for locking door 5 in bushing 9 screwed into the camera housing.

Shutter shaft 15 (Figs. 1 and 3) supports, on the outside of the shaft journal plate 7, an indicator disk 121 having a mark 122 which, when positioned opposite mark 123 of the plate, indicates that shutter 17 is in a position in which it can not collide with any other part of the camera when the door is opened.

This mechanism functions as follows:

When the camera is closed, as shown in Figs. 2, 4, and 5, the threaded portion 64 (Fig. 2) of lock shaft 62 engages the thread of stop 81 and spring 71 presses face 68 of sleeve 67 towards face 69 of stop 81 thereby establishing an exact distance between the door 5, and therefore the lens system 19, and the film confining arrangement mounted on support 3. Conus 119 of rod 92 engages bushing 9 and locks door 5 in housing 1, whereas wedge-shaped end 118 of rod 92 is retracted into the hole 91 crossing the door casting. Rod 97 is in raised position, as shown in Fig. 5, spring 107 pressing actuator 101 upwardly into the perforation 127 of door 5, thereby preventing its opening. The door edge 117 presses against face 116 of catch 112, keeping the latter away from the actuator.

Lever 103 is likewise raised and the two clutch halves engage as shown in Fig. 4. Driving shaft 56 may or may not rotate; in the former case it drives shutter 17 through worm 55, gear wheel 54, clutch 43, 44, 45, shaft 41, gears 42 and 16, and shaft 15.

When it is desired to open the camera, for example for threading film, shutter 17 is first brought into a position where it will not interfere with other parts of the camera when the door is opened. This position is present when mark 122 on disc 121 of the shutter shaft is opposite mark 123 of the housing. When the shutter is in this position, slot 49 of shaft 41 is opposite wedge 118 of rack 92.

Knob 61 is then turned, which causes screw 64 gradually to disengage from the thread of stop 81, and also rotates shaft 62 with pinion 65 on its prismatic portion 63. Pinion 65 causes rack rod 92 to move towards the left (as seen in Figs. 4 and 6) whereby wedge 118 engages slot 49, arresting the shutter, before conus 119 emerges from bushing 9, at which time actuator 101 is still within opening 127 of the door.

At the same time, rack rod 97 is moved downwardly by pinion 95, pushing actuator 101 downwardly until its upper face is flush with the surface of housing casting 1. At the same time, the actuator moves lever 103 downwardly, disengaging the clutch. During the last turn of knob 61, screw 64 leaves its thread and conus 119 its bushing 9. The door can now be opened. Before the lower end of rod 97 slides from the upper face of actuator 101, the receding edge of the opening door releases catch 112 which engages recess 102 of the actuator, thereby retaining the clutch in open position. The door can now be fully opened without any danger of the shutter colliding with other parts of the camera, or being connected to the drive while the door is open.

When the operator closes the door, the above-described sequence of functions occurs in reverse order; the faces of rod 87 and actuator 101 engage, the door edge disengages catch 112, the turning, now in opposite direction, of knob 61 first locks the door by moving conus 119 into its bushing 9, then disengages wedge 118 from slot 46, and finally the clutch between drive and shutter is closed, whereby, due to the shape of the clutch claws, there is only one position of engagement, so that the shutter is picked up in proper synchronism with the rest of the camera mechanism which may have been moved in the meantime, as for threading film.

It should be understood that the present disclosure is for the purpose of illustration only and that this invention includes all modifications and equivalents which fall within the scope of the appended claims.

I claim:

1. A device of the character described comprising a support for an optical system movable relatively to an apparatus housing, a control device for said system mounted on said support, driving means for said control device mounted on said housing, means for locking said support to said housing, means for retracting said locking means and for arresting said control device in predetermined position relatively to said support prior to the unlocking by said retracting, means for disengaging said control device from said driving means after the control device is arrested, and means associated with said disengaging means for holding said support prior to said disengagement and for retaining said disengaging means operative when said support is not ready to be locked.

2. A device of the character described comprising a camera housing, a door supporting a lens and hinged to said housing, a shutter for said lens journaled in said door, a shutter drive on said housing, a coupling between said shutter and said drive, disengageable means for normally distancing said door and lens relatively to said housing, means for locking said door in said housing, means for arresting said shutter in a predetermined position, control means for disengaging and engaging said distancing means and said locking means, for making said arresting means effective from a time prior to the unlocking until after the relocking of said door, for opening said clutch after said shutter has been arrested and for closing the clutch in predetermined relation to said drive and said shutter prior to the release of the shutter upon relocking the door, and means for holding said door in substantially closed position when said coupling is engaged and for retaining said coupling disengaged so long as said door is open.

3. A device of the character described comprising a camera housing, a door supporting a lens and connected to said housing by a hinge, a shutter for said lens journaled in said door, a shutter drive on said housing, a driving link between said shutter and said drive coaxial with said hinge, a single position clutch between said link and said drive, and means for disengaging said clutch when said door is opened.

4. A device of the character described comprising an apparatus housing, a closure for said housing, means for locking said closure to said housing, an optical system and a control movement therefor on said closure, a driving means for said movement on said housing, and means actuated by said locking means for coupling said movement and said driving means only when said closure is locked to said housing.

5. In a device of the character described, an apparatus structure, a closure movable relative thereto, driving means on said structure and a movement driven therefrom on said closure, means for locking and unlocking said closure and said structure, and means controlled by said locking means for arresting said movement and disconnecting it from said driving means prior to unlocking said closure, and for releasing and reconnecting the movement prior to locking the closure.

6. A device of the character described comprising an apparatus housing, a door fastened thereto with a hinge, a control movement on said door, a shaft for driving said movement substantially in the direction of the axis of said hinge, and means for locking said door in said housing arranged to engage and fixate said shaft when in unlocked position.

7. A device according to claim 6 further characterized by means for indicating the position of said shaft and said movement relatively to said locking and fixating means.

8. A device of the character described comprising photographic apparatus, a housing for said apparatus, a closure for said housing, means for locking said closure in said housing, an apparatus driving means including a clutch, an actuator for said clutch mounted on said housing including means tending to close said clutch, and an operator controlled by said locking means on said closure, and including means for releasing said actuator to close said clutch when said closure is locked and moving said actuator to open said clutch when said closure is unlocked.

9. A device according to claim 8 further characterized by means associated with said actuator which, when said clutch is closed, engages said housing, thereby substantially locking said closure.

10. A device according to claim 8 further characterized by means locking said actuator effectively to retain said clutch open as long as said closure remains open.

LLOYED E. WHITTAKER.